United States Patent
Lee et al.

(10) Patent No.: US 9,952,314 B2
(45) Date of Patent: Apr. 24, 2018

(54) METHOD AND DEVICE FOR SENSING ROAD ENVIRONMENT BASED ON FREQUENCY MODULATED CONTINUOUS WAVE RADAR

(71) Applicant: MANDO CORPORATION, Pyeongtaek-si (KR)

(72) Inventors: Jae Eun Lee, Seoul (KR); Hae Seung Lim, Yongin-si (KR); Seong Hee Jeong, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 633 days.

(21) Appl. No.: 14/316,480

(22) Filed: Jun. 26, 2014

(65) Prior Publication Data

US 2015/0168547 A1    Jun. 18, 2015

(30) Foreign Application Priority Data

Dec. 18, 2013 (KR) ........................ 10-2013-0157727

(51) Int. Cl.
    *G01S 7/41*     (2006.01)
    *G01S 13/34*     (2006.01)
    *G01S 13/93*     (2006.01)

(52) U.S. Cl.
    CPC ................ *G01S 7/41* (2013.01); *G01S 7/415* (2013.01); *G01S 13/345* (2013.01);
    (Continued)

(58) Field of Classification Search
    CPC . G01S 7/41; G01S 7/415; G01S 7/412; G01S 13/32; G01S 13/343; G01S 13/36;
    (Continued)

(56) References Cited

U.S. PATENT DOCUMENTS 5,731,778 A * 3/1998 Nakatani ................. G01S 7/354
    342/109
6,140,954 A * 10/2000 Sugawara ............. G01S 13/345
    342/128

(Continued)

FOREIGN PATENT DOCUMENTS

CN      101271158      9/2001
CN      101271159      9/2008

(Continued)

OTHER PUBLICATIONS

Office Action dated Nov. 2, 2016 for Chinese Patent Application No. 201410297992.9 and its English summary provided by Applicant's foreign counsel and machine translation provided by Google translate.

*Primary Examiner* — Timothy A Brainard
*Assistant Examiner* — Daniel P Malley, Sr.
(74) *Attorney, Agent, or Firm* — Ladas & Parry, LLP

(57) ABSTRACT

Disclosed herein are a method and device for sensing a road environment based on a frequency modulated continuous wave (FMCW) radar. A method for detecting a road environment based on the FMCW radar includes the steps of: the FMCW radar performing a first scan to acquire a first frequency spectrum of beat signals, and shifting the first frequency spectrum based on first velocity information of a vehicle on performing the first scan; the FMCW radar performing a second scan to acquire a second frequency spectrum of beat signals, and shifting the second frequency spectrum based on second velocity information of the vehicle on performing the second scan; acquiring correlation information between the shifted first frequency spectrum and the shifted second frequency spectrum; and comparing the correlation information with a set threshold value and detecting the road environment.

12 Claims, 9 Drawing Sheets

(52) U.S. Cl.
CPC ............ *G01S 13/931* (2013.01); *G01S 7/412* (2013.01); *G01S 2013/9353* (2013.01); *G01S 2013/9375* (2013.01)

(58) Field of Classification Search
CPC ...... G01S 13/345; G01S 13/58; G01S 13/583; G01S 13/584; G01S 13/931; G01S 2013/9353; G01S 2013/9375
See application file for complete search history.

(56) References Cited

U.S. PATENT DOCUMENTS

| | | | |
|---|---|---|---|
| 6,317,073 B1 | 11/2001 | Tamatsu et al. | |
| 2004/0227662 A1* | 11/2004 | Sawamoto | G01S 13/584 342/70 |
| 2005/0174282 A1* | 8/2005 | Nakanishi | G01S 7/354 342/109 |
| 2008/0042894 A1* | 2/2008 | Kikuchi | B60W 10/184 342/71 |
| 2009/0009381 A1* | 1/2009 | Inaba | G01S 13/34 342/109 |
| 2009/0052737 A1* | 2/2009 | Lycett | G01S 13/91 382/103 |
| 2011/0102248 A1* | 5/2011 | Maeno | G01S 7/2927 342/179 |
| 2011/0109492 A1* | 5/2011 | Nakahama | G01S 7/295 342/89 |
| 2012/0127016 A1* | 5/2012 | Watanabe | G01S 7/412 342/70 |
| 2012/0268316 A1* | 10/2012 | Kanamoto | G01S 3/74 342/158 |
| 2014/0184437 A1* | 7/2014 | Takabayashi | G01S 13/66 342/107 |

FOREIGN PATENT DOCUMENTS

| | | |
|---|---|---|
| CN | 101535834 | 9/2009 |
| CN | 102053241 | 5/2011 |
| JP | 2010-112937 | 5/2010 |

* cited by examiner (a)

(b)

METHOD AND DEVICE FOR SENSING ROAD ENVIRONMENT BASED ON FREQUENCY MODULATED CONTINUOUS WAVE RADAR

CROSS-REFERENCE TO RELATED APPLICATION

This application claims priority to Korean Patent Application No(s). 10-2013-0157727, filed on Dec. 18, 2013, the disclosure of which is incorporated herein by reference in its entirety.

BACKGROUND OF THE INVENTION

Field of the Invention

Exemplary embodiments of the present invention relate to a method for sensing a road environment, and more particularly, to a method and device for sensing a road environment based on a frequency modulated continuous wave (FMCW) radar.

Description of the Related Art

ITU-R recommends various items related to Transport Information and Control Systems (TICS). The Transport Information and Control Systems are systems in which computer, communication, positioning information and vehicle technologies are integrated in order to improve the safety, the efficiency and the management method of terrestrial traffic systems.

Of the TICS, the Advanced Vehicle Control Systems (AVCS) directly related to travel of a vehicle include several items required for preventing a collision, wherein a radar for a vehicle is one of technologies which can be applied for safe travel of the vehicle through assistance for the driver.

A radar using a laser beam had been commercialized as a radar for a vehicle in Japan in the early 1980's. However, since the laser beam is so susceptible to various weather conditions or the like, a method using a millimeter wave has nowadays been widely spread. Since a radar for a vehicle using a millimeter wave causes relatively less errors even in various weather conditions on the characteristics of application, and has a feature wherein usage is easy, a radar for a vehicle using a millimeter wave is one of fields for which research is being the most actively conducted. Research for the method is started from the early 1970's, and various products are nowadays mounted on vehicles and operate. Application technologies of vehicle radars are called an active cruise control, an adaptive cruise control, an intelligent cruise control, or the like, representative companies applying the technologies to vehicles include Daimler-Benz, BMW, Jaguar, and Nissan. Especially, the fact that application instances as described above perform a direct vehicle control over a simple alarm using a radar may be regarded as a remarkable technical advance.

In Korea, according to the regulation of Radio Law Article 9, frequencies for vehicle radars are classified and distributed into specific small-output wireless stations in connection with an intelligent traffic system on April 2001. Herein, a frequency band of 76 GHz-77 GHz having a bandwidth of 1 GHz is employed, and the use thereof is stipulated for collision prevention of vehicles or the like.

SUMMARY OF THE INVENTION

A first object of the present invention is to provide a method for sensing a road environment based on an FMCW radar.

A second object of the present invention is to provide a device which performs the method for sensing a road environment based on an FMCW radar.

In accordance with one aspect of the present invention to solve the first object of the present invention, a method for detecting a road environment based on a frequency modulated continuous wave (FMCW) radar may include the steps of: the FMCW radar performing a first scan to acquire a first frequency spectrum of beat signals, and shifting the first frequency spectrum based on first velocity information of a vehicle on performing the first scan; the FMCW radar performing a second scan to acquire a second frequency spectrum of beat signals, and shifting the second frequency spectrum based on second velocity information of the vehicle on performing the second scan; acquiring correlation information between the shifted first frequency spectrum and the shifted second frequency spectrum; and comparing the correlation information with a set threshold value and detecting the road environment. The step of comparing the correlation information with a set threshold value and detecting the road environment may include the steps of: determining that a fixed structure exists in surroundings of the vehicle when the correlation value is greater than the threshold value; and determining that the fixed structure does not exist in surroundings of the vehicle when the correlation value is equal to or less than the threshold value. The first velocity information may be acquired based on peak information of the first frequency spectrum which has been acquired; and the second velocity information may be acquired based on peak information of the second frequency spectrum which has been acquired. The first velocity information and the second velocity information may be calculated based on information on environments of a road on which the vehicle is traveling. The first velocity information and the second velocity information may correspond to values which are calculated by taking curvature information of a curved road into consideration when the vehicle is traveling on the curved road. The curvature information may be acquired by detecting a traffic lane region and performing a curved line template matching based on the detected traffic lane region.

In accordance with another aspect of the present invention to solve the second object of the present invention, a frequency-modulated continuous wave (FMCW) radar for detecting a road environment includes a processor, wherein the processor may be implemented: to perform a first scan to acquire a first frequency spectrum of beat signals, and to shift the first frequency spectrum based on first velocity information of a vehicle on performing the first scan; to perform a second scan to acquire a second frequency spectrum of beat signals, and to shift the second frequency spectrum based on second velocity information of the vehicle on performing the second scan; to acquire correlation information between the shifted first frequency spectrum and the shifted second frequency spectrum; and to compare the correlation information with a set threshold value and to detect the road environment. The processor may determine that a fixed structure exists in surroundings of the vehicle when the correlation value is greater than the threshold value, and determine that the fixed structure does not exist in surroundings of the vehicle when the correlation value is equal to or less than the threshold value. The first velocity information may be acquired based on peak information of the first frequency spectrum which has been acquired; and the second velocity information may be acquired based on peak information of the second frequency spectrum which has been acquired. The first velocity information and the second velocity information may be calculated based on information on environments of a road on which the vehicle is traveling. The first velocity information and the second velocity information may correspond to values which are calculated by taking curvature information of a curved road into consideration when the vehicle is traveling on the curved road. The curvature information may be acquired by detecting a traffic lane region and performing a curved line template matching based on the detected traffic lane region.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
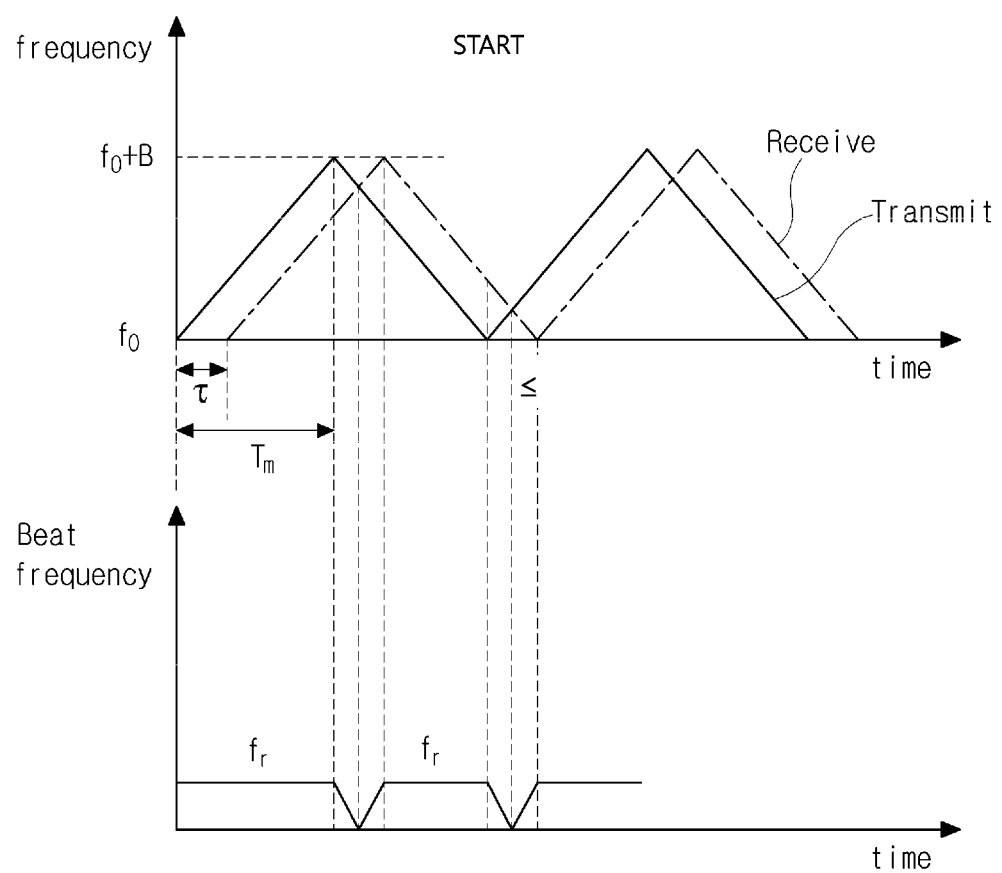
FIG. 1 is a graph representing a method for sensing an object using an FMCW radar.

As the present invention may make various changes and have various forms, it is intended to illustrate specific embodiments in the drawings and describe them in detail. However, it should be understood that this is intended not to limit the present invention to specific disclosed forms but to include all changes, equivalents and replacements that fall within the spirit and technical scope of the present invention. Like reference signs are used for like components in describing each drawing.

Although the terms like a first and a second are used to describe various components, the components should not be limited by the terms. The terms may be used for the purpose of distinguishing one component from another. For example, a first component may be named a second component and similarly, a second component may be named a first component without departing from the scope of right of the present invention. The term and/or includes a combination of a plurality of related described items or any of the plurality of related described items.

When being mentioned that a certain component is "connected" or "coupled" to another component, the former may directly be connected or coupled to the latter but the third component may exist between them. On the other hand, when being mentioned that a certain component is "directly connected" or "directly coupled" to another component, it should be understood that the third component does not exist between them.

The terms used herein are just for describing specific embodiments and are not intended to limit the present invention. The terms of a singular form may include plural forms unless clearly otherwise referred to in context. In this application, it should be understood that the term "include," "comprise," "have", "including", "comprising", or "having" is intended to specify that there are features, figures, steps, operations, components, parts or their combinations represented in the specification and not to exclude that there may be one or more other features, figures, steps, operations, components, parts, or their combinations or that they may be added.

Hereinafter, embodiments of the present invention will be described in more detail below with reference to the accompanying drawings. Hereinafter, the same reference numerals are used to designate the same component, and description thereof will not be repeated.

An embodiment of the present invention pertains to a method for sensing a road environment on the basis of a frequency modulated continuous wave (FMCW) radar during vehicle travel. By using a road environment sensing method according to an embodiment of the present invention, it is possible to more accurately sense a road environment.

FIG. 1 is a graph representing a method for sensing an object using an FMCW radar.

The FMCW radar can transmit a frequency-modulated continuous signal to a target, and measure the distance to the target and the velocity of the target.

A conventional continuous wave (CW) radar can measure the velocity of a moving object, but cannot measure the distance to the moving object due to a relatively narrow bandwidth. In contrast, the FMCW radar expands the bandwidth of a wave to be transmitted by modulating the amplitude, frequency or phase thereof, and thus enables a distance measurement and a velocity measurement.

Referring to FIG. 1, a frequency waveform as a function of time when it is assumed that an object distanced by distance "R" from a radar has stopped is shown. First, when a linearly frequency-modulated signal, such as a first waveform, is transmitted, the signal is reflected by the object distanced by distance "R" and then is received by the radar after a time delay $$\frac{2R}{c}.$$

Here, "R" represents a distance to the target, and "c" represents the velocity ($3 \times 10^8$ m/s) of light. In this case, when the transmitted signal and the received signal are mixed with each other, a difference frequency between the signals can be obtained, as shown in Equation 1 below:

$$f_r = \frac{2R}{c} \cdot \frac{B}{T_m} \tag{1}$$

R: distance to target
B: sweep bandwidth
c: velocity of light
$T_m$: sweep time
$F_r$: frequency shift due to delay When the difference frequency information calculated in Equation 1 is substituted into Equation 2 below, the distance "R" can be determined.

$$R = \frac{f_r \cdot c \cdot T_m}{2 \cdot B} \quad (2)$$

Figure 2:
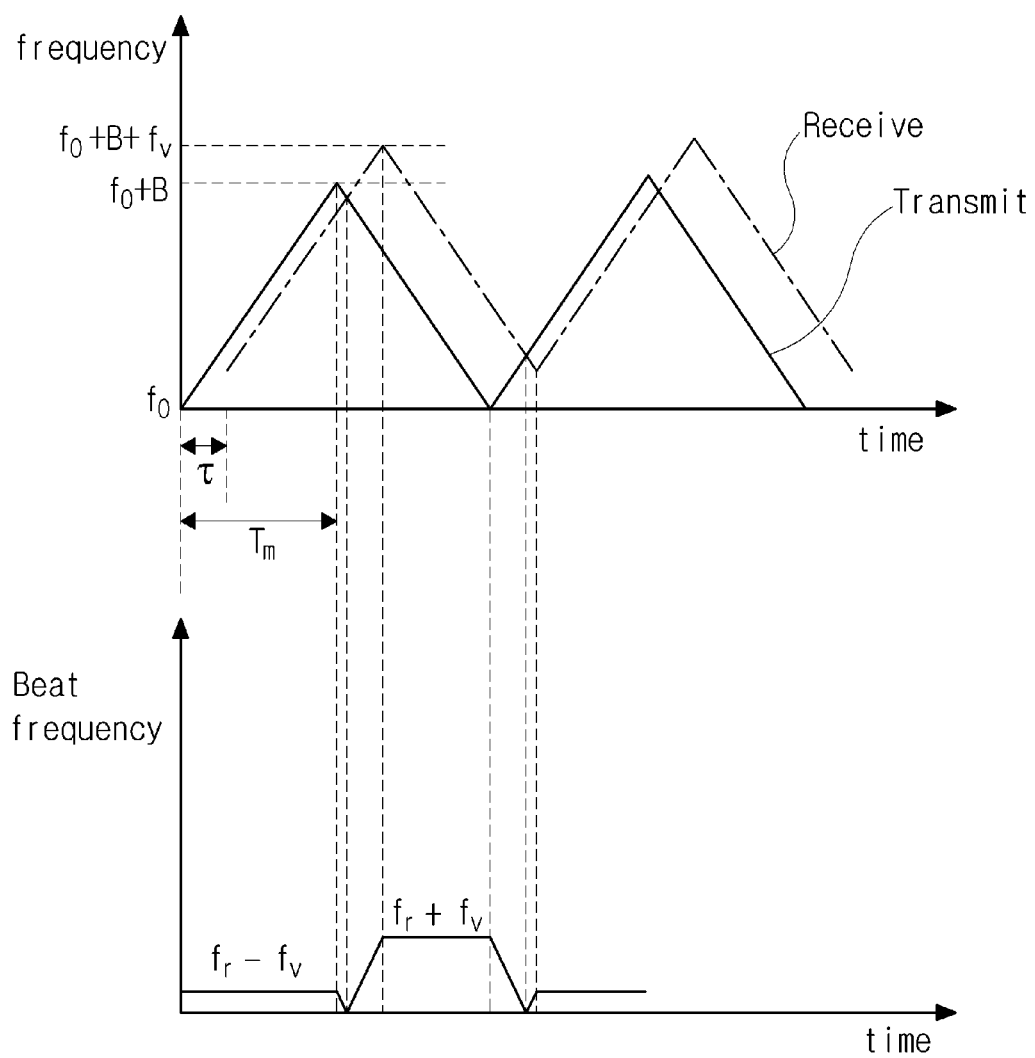
FIG. 2 is a graph representing a method for sensing a target using an FMCW radar.

FIG. 2 is a graph representing a method for sensing a target using an FMCW radar.

It is assumed that an object distanced by distance "R" from the FMCW radar is moving at a relative velocity $V_r$.

The FMCW radar may transmit a frequency-modulated continuous signal to measure the velocity of a target and the distance to the target. In this case, a frequency shift such as Equation 3 below is generated due to the time delay of $$\frac{2R}{c}$$

and the Doppler effect.

$$f_v = \frac{2v_r}{\lambda} \quad (3)$$
$$\lambda = \frac{c}{f_c}$$

$f_c$: carrier frequency

When the transmitted signal and a received signal are mixed with each other, the sum of and the difference between a frequency change $f_r$ due to time-delay according to distance and a frequency change $f_v$ (Doppler frequency) due to the Doppler effect can be obtained as shown in a lower portion in FIG. 2. When simultaneous equations are solved with the sum and the difference, information on a distance and a velocity can be obtained as shown in Equation 4 below.

$$R = \frac{f_r \cdot c \cdot T_m}{2 \cdot B} \quad (4)$$
$$V_r = \frac{f_v \cdot \lambda}{2}$$

A beat frequency and a Doppler frequency can be obtained by a signal processing.

The beat frequency may represent the difference between a transmitted signal and a received signal. On an up-chirp, the beat frequency may be expressed as $f_{bu}$, while on a down-chirp, the beat frequency may be expressed as $f_{bd}$.

By an $N_s$-point discrete Fourier transform (DFT) in each chirp period, a frequency spectrum of a beat signal sampled by a frequency $f_s$ can be obtained. On the basis of the frequency spectrum of a beat signal determined by an FMCW radar, it is possible to sense a surrounding environment and to detect an object existing in a surrounding area. In the FMCW radar, while a signal reception unit of the FMCW radar is receiving a signal obtained from a sensing signal reflected by a target, a signal transmission unit of the FMCW radar can continuously transmit a sensing signal. The FMCW radar can generate a beat signal by mixing the waveforms of the received signal and the transmitted sensing signal with each other. When two or more targets exist, beat signals having two or more mutually different frequency bands may be generated as the output of a mixer.

Figure 3:
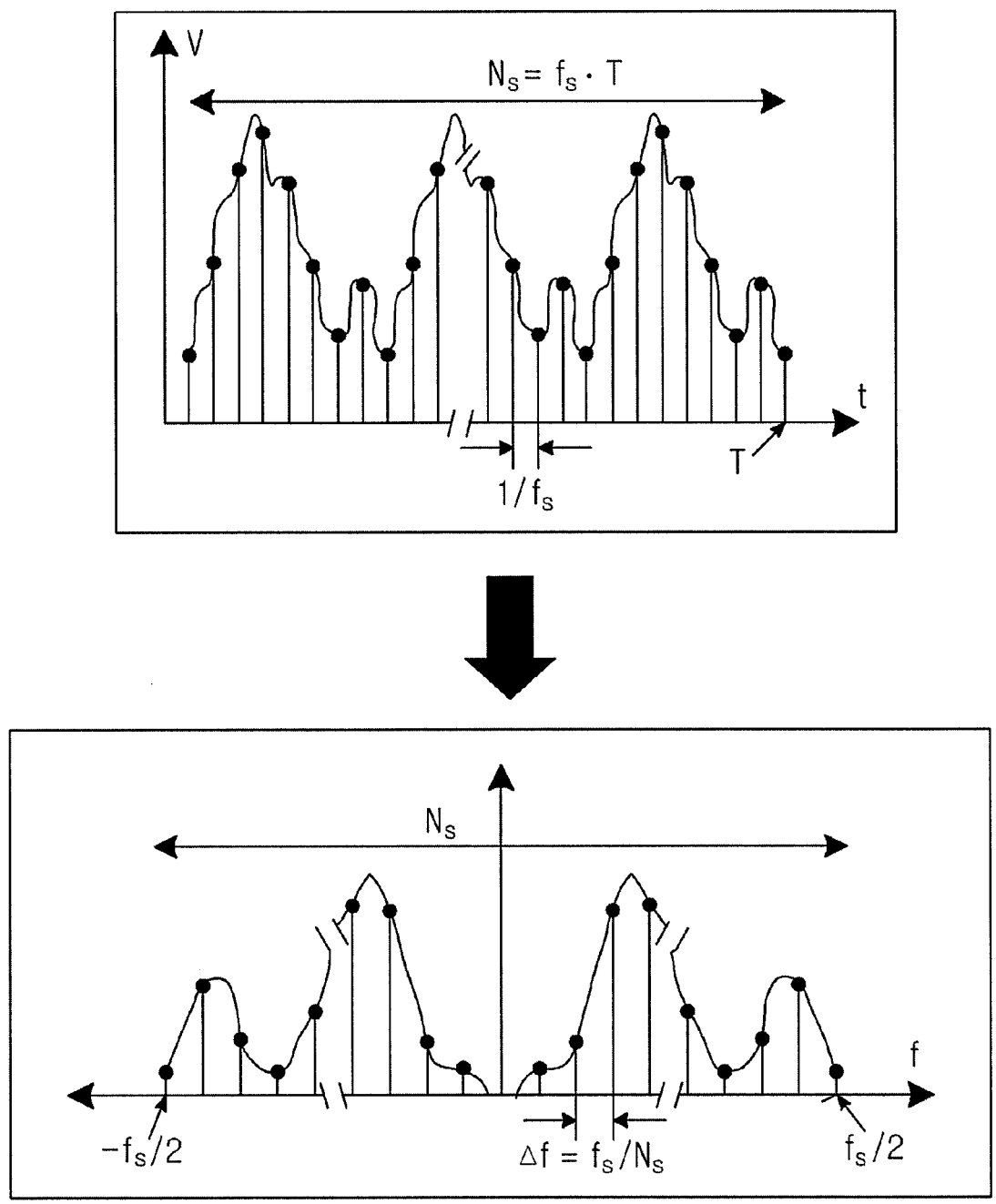
FIG. 3 is a graph representing sampling of a beat signal on the basis of DFT.

FIG. 3 is a graph representing sampling of a beat signal on the basis of DFT.

Referring to FIG. 3, the spectrum of a beat signal sampled by a frequency $f_s$ by performing an $N_s$-point DFT in each chirp period is shown.

"Δf" represents a frequency step, and "$N_s$" represents the number of data samples in a chirp period "T".

The FMCW radar performs a pairing on frequency peak information extracted from each of up-chirp and down-chirp, and thus generates information on a target.

When the relative velocity of a forward vehicle has a positive value (e.g. when the forward vehicle becomes farther and farther from his/her own vehicle), the frequencies detected in an up-chirp and a down-chirp, which are a frequency increase section and a frequency decrease section, respectively, are $f_{bu} = f_r - f_d$ and $f_{bd} = f_r + f_d$. That is to say, since values shifted to be symmetrized by $\pm f_d$ on the basis of $f_r$ are $f_{bu}$ and $f_{bd}$, when a combination thereof is found, a distance and a velocity can be calculated. Such a method is called a pairing algorithm.

On performing the pairing algorithm, when two targets exist, more targets than the two targets may be detected, and such an additionally detected target is called a ghost target. When such a ghost target exists, it is difficult for the FMCW radar to accurately sense an object.

On performing a pairing algorithm, as the number of targets increases, the number of ghost targets increases. Various methods are used not to generate ghost targets. However, as the number of frequency peaks extracted in an up-chirp/down-chirp increases, the probability of generation of ghost targets increases. When a structure, such as a tunnel or a guide rail, is stretched on a road, a more difficult environment may be made in sensing by the radar, and in this case, the generation of ghost targets may reduce the sensing and control stability of the radar.

According to the sensing method based on an FMCW radar according to an embodiment of the present invention, information on fixed objects, such as a guide rail or a tunnel, existing in the surroundings of a road can be acquired based on the frequency spectrum of an acquired beat signal and the velocity of a vehicle. According to such a method, the FMCW radar can accurately acquire information on a road environment, and also can more accurately determine information on another target which is moving on a road.

Figure 4:
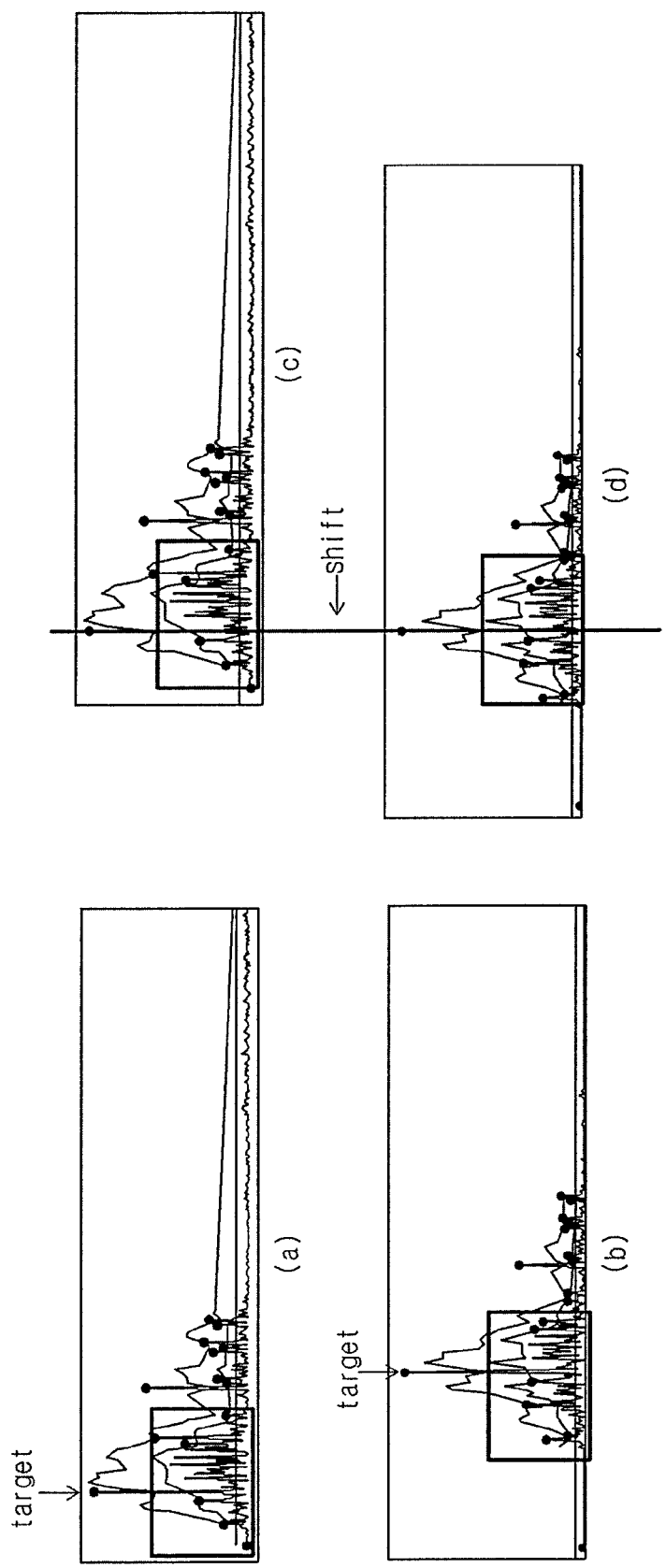
FIG. 4 is a conceptual view representing a method for detecting a road environment according to an embodiment of the present invention.

FIG. 4 is a conceptual view representing a road environment detection method according to an embodiment of the present invention.

Referring to left-side graphs (a) and (b) in FIG. 4, the frequency spectrums of beat signals acquired after an FMCW signal is transmitted and is mixed with a received signal are shown. Since a guide rail, a tunnel, or the like is distributed lengthwise along a road in an area sensed by the FMCW radar, the level of the frequency spectrum of a corresponding region increases.

In the graphs of FIG. 4, x-axes represent valid frequency ranges, and y-axes represent the magnitudes of beat signals, wherein a frequency spectrum extracted from the entire valid frequency range may include peaks. Information on a road environment can be acquired based on information on many peaks existing in a specific range, as shown in FIG. 4.

According to an embodiment of the present invention, after a frequency offset is removed in a spectrum shifted to left or right by the velocity of a traveling vehicle, as shown in right-side graphs (c) and (d) of FIG. 4, information on a structure existing in the surroundings of a road can be acquired based on a method of taking a correlation between frequency spectrums. A correlation between frequency spectrums may be performed based on a correlation function. The correlation function may be a function representing the similarity of components between two signals or the same signals.

An environment, such as a guide rail or a tunnel, located in the surroundings of a vehicle is an object existing at a fixed position. Therefore, in such an environment, when a frequency offset is removed in spectrums shifted in consideration of the velocity of a vehicle, and then a correlation between frequency spectrums is taken, a high correlation value can be obtained. In this case, the velocity of a vehicle used to shift a frequency spectrum may be acquired through a velocity sensor mounted on the vehicle, or the velocity of a corresponding vehicle may be estimated by extracting a representative peak from the frequency spectrum of each of up-chirp and down-chirp and using the representative peak.

That is to say, when two acquired frequency spectrums have a high correlation value, it may be determined that a road structure, such as a guide rail, a tunnel, or the like, exists in the surroundings of a currently traveling vehicle. The FMCW radar may acquire correlation information on frequency spectrums in up-chirp/down-chirp whenever a scan is performed, compare the acquired correlation information with a threshold value of a specific level, and recognize whether or not a structure, such as a guide rail or a tunnel, exists in the surroundings of a road on which a vehicle is traveling.

For example, an FMCW radar may perform operations as described below. The FMCW radar may acquire a first frequency spectrum of a beat signal by performing a first scan, and shift the first frequency spectrum based on first velocity information of a vehicle on the first scan. In addition, the FMCW radar may acquire a second frequency spectrum of a beat signal by performing a second scan, and shift the second frequency spectrum based on second velocity information of the vehicle on the second scan. Correlation information between the shift first frequency spectrum and the shift second frequency spectrum is acquired, the acquired correlation information is compared with a set threshold value, and thereby, a road environment can be detected.

Whether or not many structures, such as a guide rail, a tunnel or the like, exists in the surroundings of a road is determined based on such a method for detecting a structure existing in the surroundings of a road, a correlation generation range is considered to exclude a corresponding frequency range, so that information on a moving object (e.g. a nearby vehicle on traveling) can be more accurately determined.

Figure 5:
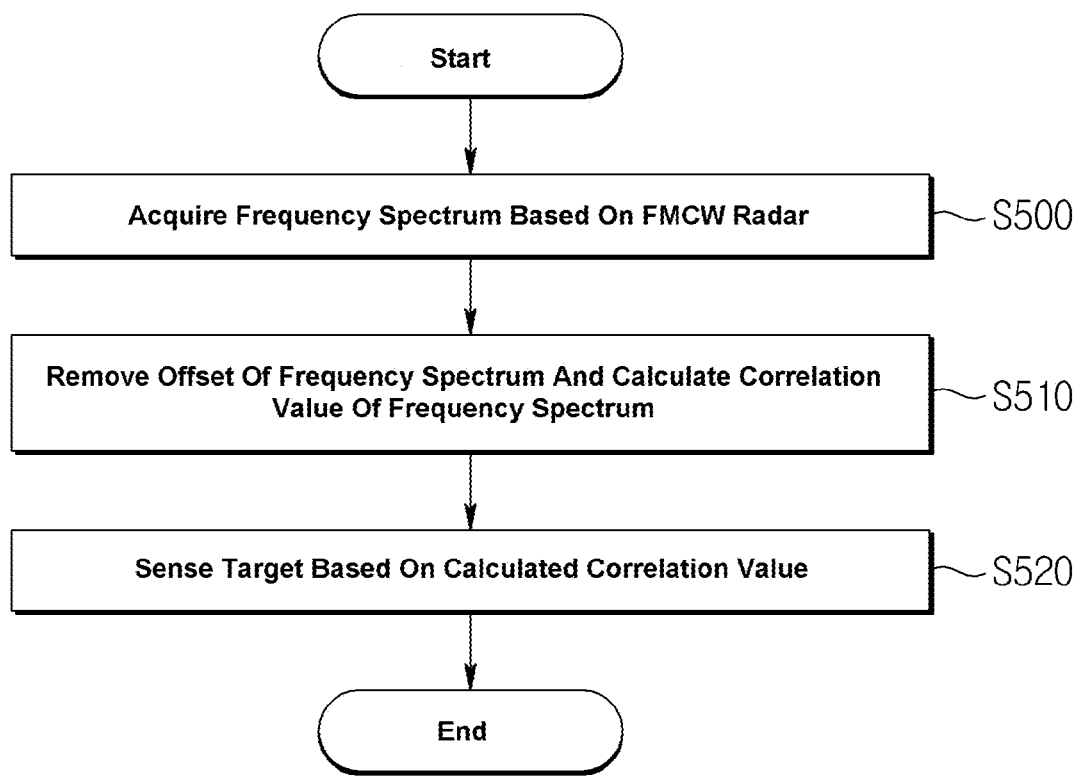
FIG. 5 is a flowchart representing a method for detecting a road environment according to an embodiment of the present invention.

FIG. 5 is a flowchart illustrating a method for detecting a road environment according to an embodiment of the present invention.

Referring to FIG. 5, frequency spectrums sensed based on an FMCW radar are acquired in step S500.

As described above, the FMCW radar may transmit a frequency-modulated continuous sensing signal to measure the distance to a target and the velocity of the target. The transmitted continuous sensing signal may be reflected by an object existing within a sensing range, and the FMCW radar may receive a response signal (or a reflected signal) in response to the sensing signal.

The FMCW radar may generate the frequency spectrum of a beat signal by mixing the transmitted sensing signal and the received response signal, and performing a signal processing, such as an FFT, on the mixed signal. The FMCW radar generates target information by pairing frequency peak information extracted in each of up-chirp and down-chirp.

According to an embodiment of the present invention, information on the environments of a rode on which a vehicle is traveling can be acquired based on the frequency spectrum of a beat signal, which is acquired after an FMCW signal is transmitted and is mixed with a received signal. Since a guide rail, a tunnel, or the like is distributed lengthwise along a road in an area sensed by the FMCW radar, the level of the frequency spectrum of a corresponding region increases.

A frequency offset is removed from the frequency spectrums, and a correlation value between the frequency spectrums is calculated in step S510.

A structure existing in the surroundings of a road can be recognized by removing a frequency offset from spectrums individually shifted to left/right by the velocity of a traveling vehicle, and taking a correlation between frequency spectrums. The velocity of the vehicle may be acquired through a velocity sensor mounted on the vehicle, or may be acquired by extracting a representative peak from the frequency spectrum of each of up-chirp and down-chirp.

A target is sensed based on a calculated correlation value in step S520.

When the calculated correlation value is large, it may be determined that a road structure, such as a guide rail, a tunnel or the like, exists in the surroundings of a vehicle which is currently traveling. Since a road structure is a fixed object, a high correlation value is acquired. The FMCW radar may acquire a correlation between frequency spectrums in up-chirp/down-chirp whenever a scan is performed, and may recognize whether or not a structure, such as a guide rail, an iron tunnel, or the like, exists based on a threshold value of a specific level.

A road structure may be sensed as a target having distance information which is proportional to the velocity of a vehicle according to the velocity of the vehicle. However, in a specific road environment, a road structure may be sensed as a target not having distance information which is proportional to the velocity of a vehicle according to the velocity of the vehicle. For example, in the case of a guide rail located on a curved road, when a vehicle is traveling along the curved road, the locations of the guide rail detected according to the position of the vehicle may not have values proportional to the velocity of the vehicle. Hereinafter, according to an embodiment of the present invention, a method for acquiring road environment information by calculating a correlation in a frequency range which is generated based on the shapes of various road structures existing on a road on which a vehicle is traveling will be described.

Figure 6:
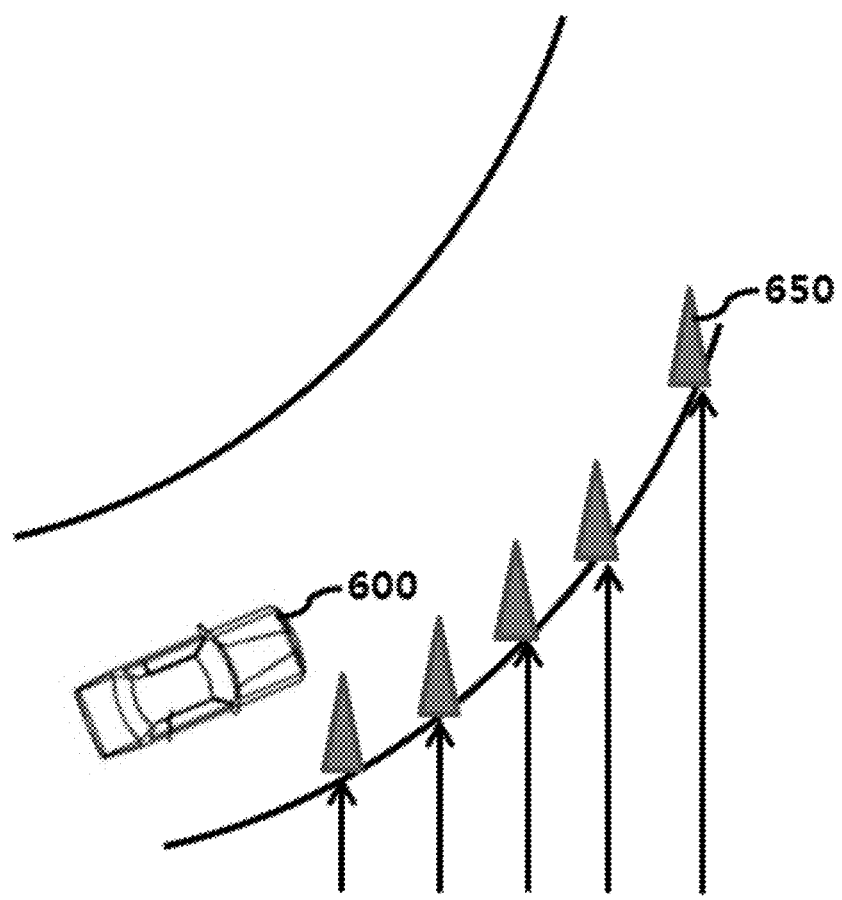
FIG. 6 is a conceptual view representing a method for detecting a road environment according to an embodiment of the present invention.

FIG. 6 is a conceptual view explaining a method for detecting a road environment according to an embodiment of the present invention.

FIG. 6 illustrates a method for sensing whether or not a fixed structure, such as a guide rail, exists when a vehicle is traveling on a curved main road.

Referring to FIG. 6, when it is assumed that a vehicle 600 senses a guide rail located on a curved main road, not on a straight main road, and detects a road environment, a sensed value which is different from a value sensed from a guide rail located on a straight main road may be acquired. That is to say, with respect to a guide rail located on a straight main road, information on distances sensed from the guide rail may be proportional to the velocity of the vehicle 600. In contrast, with respect to a guide rail 650 located on a curved main road, distances sensed from the guide rail 650 may be not proportional to the velocity of the vehicle 600. In this case, in order to calculate a correlation value of a frequency range, a road environment may be detected with a new velocity parameter which is calculated based on values obtained by taking the velocity of the vehicle 600 and the curvature of the road into consideration. For example, when the vehicle 600 is traveling a road other than a straight main road, a structure in the surroundings of the road may be recognized by: removing a frequency offset from spectrums individually shifted left/right based on a curved vehicle velocity which calculated by the curvature of the road to the velocity of the vehicle 600; and then taking a correlation of frequency spectrums. By using such a method, even when the vehicle 600 is traveling on a curved main road, the vehicle 600 can actually sense information on the guide rail 650 located in the surroundings of the road.

According to another embodiment of the present invention, a guide rail in the surroundings of a curved main road may be sensed based on template information of specific frequency spectrums which may be generated on traveling the curved main roads. For example, the FMCW radar may store information on template frequency spectrums of a guide rail or a tunnel, which is sensed when a vehicle is traveling on a curved road. In this case, when a correlation between the template frequency spectrums and an acquired frequency spectrum is calculated, and the calculated correlation value is equal to or greater than a threshold value, the FMCW radar may sense a guide rail, a tunnel, or the like, which exists in the surroundings thereof.

The curved vehicle velocity transformed from the velocity of a vehicle may be calculated by reflecting the moving direction of the vehicle and the curvature of the road. A vehicle may calculate the curvature of a traffic lane in various manners.

Figure 7:
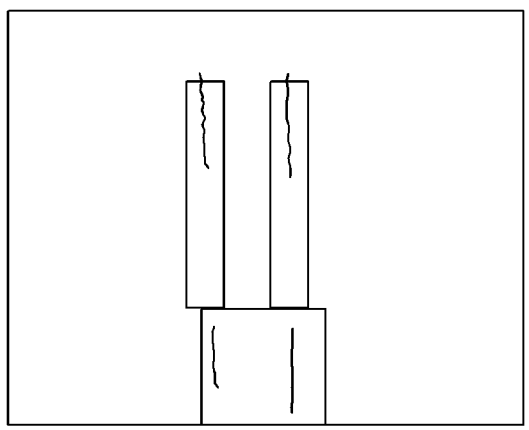
FIG. 7 is a conceptual view representing a method for calculating the curvature of a road according to an embodiment of the present invention.
Figure 7:
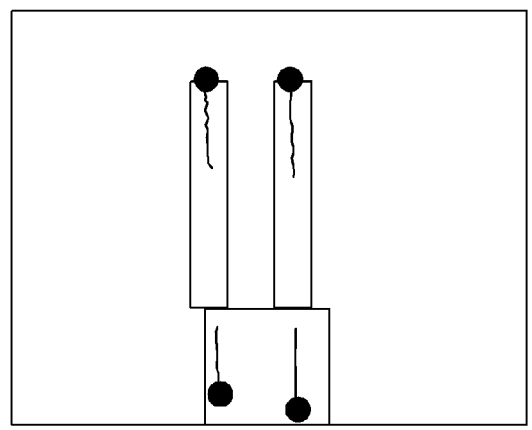

FIG. 7 is a conceptual view representing a method for calculating the curvature of a road according to an embodiment of the present invention.

Referring to FIG. 7, according to an embodiment of the present invention, a curved traffic lane and the curvature thereof may be detected using a method of: making a curved line template based on an arc connecting a start point and an end point which are determined on a straight lane detection; and retrieving a curved line template having the highest matching degree with a current traffic lane. By using such a method, a traffic lane can be simply and rapidly detected, and the curvature of the traffic lane can be accurately calculated.

A curved line template matching method may be implemented in such a manner as to make a curved line template using the equation of a circle, to find a template having the highest matching degree with a traffic lane, and to determine a curved line. However, when a traffic lane is discontinuous and the length of the traffic lane is short, detected start point and end point may be near each other, so that a curvature may not appear. In order to compensate such a case, a method for setting an expanded traffic lane detection area and detecting a long-distance traffic lane may be used. That is to say, a method of resetting an end point in a detected long-distance traffic lane may be used, so that a curvature can be easily detected even from a discontinuous traffic lane.

In FIG. 7, (a) indicates an expanded traffic lane detection area. The expanded traffic lane detection area may be determined by the positions of detected end points of first-detected left and right traffic lanes. Then, a width of about 10 pixels left and right with respect to the positions of the determined end points is determined, and the start points of the traffic lane may be detected from an upper region of the determined width. For example, the traffic lane detection method may be implemented in such a manner as to accumulate the pixels of a detected edge region in the same way as that in an initial traffic lane detection region, to detect a start point by finding the greatest accumulated position, and to determine a final point using a continuous edge accumulation method. In FIG. 7, (b) indicates a view showing the start points and end points of traffic lanes detected in an expanded traffic lane detection region.

According to an embodiment of the present invention, the curvature of a curved traffic lane may be determined using a curved line template matching method based on traffic lane information acquired as above.

A curved traffic lane may be expressed as an arc which is a portion of a circle. Therefore, the curvature of a curved traffic lane may be detected using the equation of a circle. Equation 5 below represents the equation of a circle.

$$x^2+y^2+Ax+By+C=0 \quad (5)$$

The equation of a circle can be obtained when information on three or more points is known. According to an embodiment of the present invention, the equation of a circle may be calculated using a start point and an end point, determined in the aforementioned traffic lane detection method, and one point on a normal line passing through the center point between the start and end points; and thereby, a curved line template may be generated. When a point on a normal line is moved to another position, curved line templates passing through start and end points and having mutually different curvatures can be generated.

Since a curved line appearing in a captured image is shown smaller than a curved line made when moving by a difference between a start point and an end point in a normal-line direction from a center between the start point and the end point, according to an embodiment of the present invention is implemented to determine the number of templates depending on a difference between the x coordinate vales of the start point and end point.

$$\text{Number of Templates} = |x \text{ coodinate of start po int} - x \text{ coodinate of end po int}| \quad (6)$$

The curvature of a road on which a vehicle is traveling can be determined by matching each generated template with a traffic lane and finding a curved line having the highest matching degree.

Figure 8:
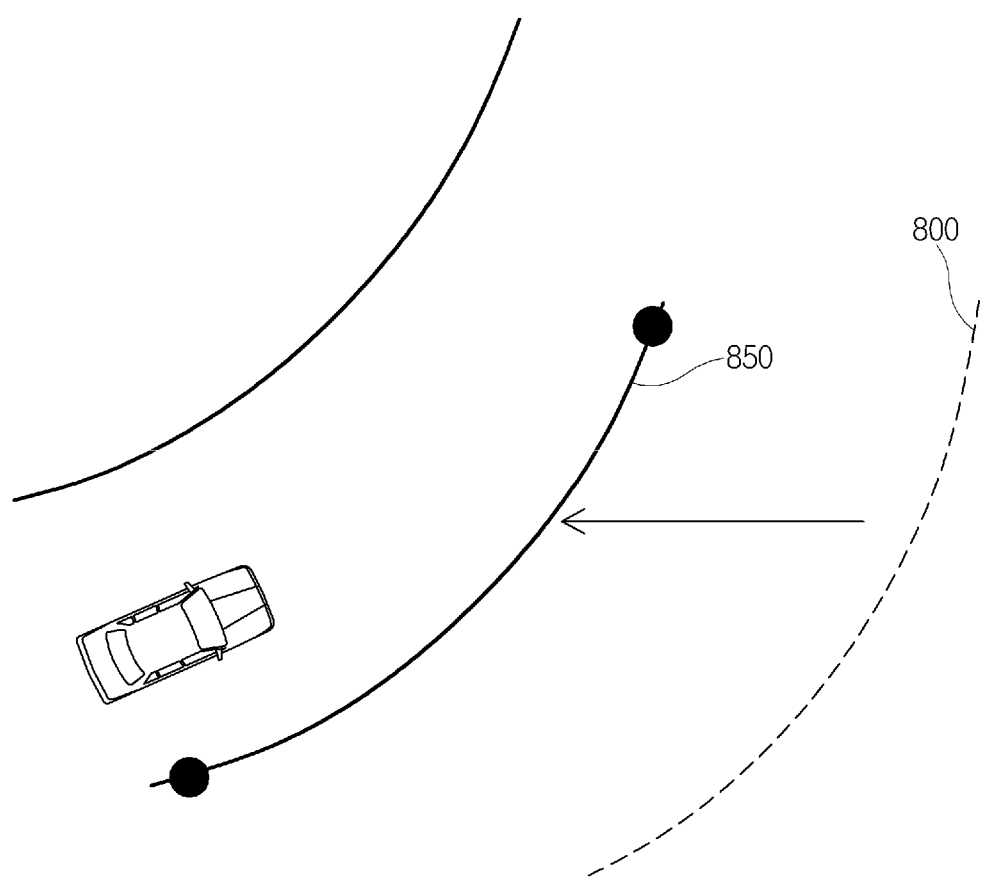
FIG. 8 is a conceptual view illustrating curved line template matching according to an embodiment of the present invention.

FIG. 8 is a conceptual view illustrating curved line template matching according to an embodiment of the present invention.

The matching degree of a template may be calculated by dividing the number of pixels of an edge component matched with each template 800 by the number of pixels having each template 800.

The matching degree may be calculated with Equation 7 below.

$$\text{Matching Degree} = \frac{\text{Number of Matched Edge Pixels}}{\text{Number of Curved Line Template Pixels}} \quad (7)$$

When a curved line is determined according to a matching degree, the radius of a circle drawn by the arc of the curved line can be calculated.

Since a curvature is the same as the reciprocal of a radius, the curvature of a detected curved line can be calculated using Equation 8 below.

$$\text{Curvature} = \frac{1}{r} = \frac{2}{\sqrt{A^2 + B^2 - 4C}} \qquad (8)$$

Based on information on the curvature of a road 850 on which a vehicle is traveling, which is determined using Equation 8, the velocity of the vehicle for shifting a frequency spectrum can be calculated.

The aforementioned embodiment relates to a case in which a vehicle is traveling on a curved main road, and a correlation between frequency spectrums may be calculated based on information on various road environments. Such information on road environments may be acquired from a device such as a navigation device, a correlation between frequency spectrums may be calculated by taking into consideration the road environment information acquired from the navigation device, and thus road environment information can be accurately acquired.

Figure 9:
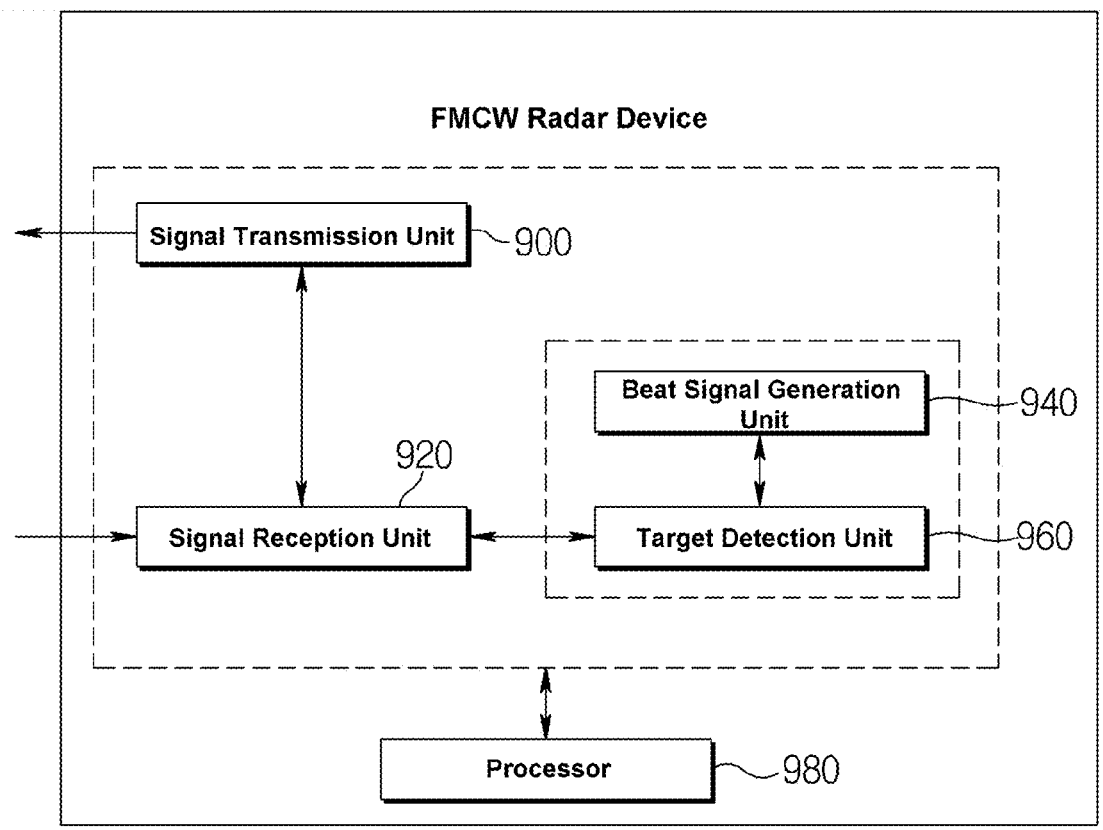
FIG. 9 is a conceptual view illustrating an FMCW radar device according to an embodiment of the present invention.

FIG. 9 is a conceptual view illustrating an FMCW radar device according to an embodiment of the present invention.

Referring to FIG. 9, the FMCW radar device according to an embodiment of the present invention may include a signal transmission unit 900, a signal reception unit 920, a beat signal generation unit 940, a target detection unit 960, and a processor 980. The respective components of the FMCW radar device may be implemented to perform the operation of the FMCW radar, described with reference to FIGS. 1 to 8. For convenience of description, the respective components are distinguished according to functions, wherein one component may be implemented with a plurality of components, and a plurality of components may be implemented with one component.

The signal transmission unit 900 may be implemented to transmit a sensing signal of an FMCW radar. The signal transmission unit 900 may be implemented to control the interval between the transmission start time points of transmission signals, and to transmit a transmission signal every determined transmission start time point according to the controlled interval between the transmission start time points. For example, the signal transmission unit 900 may include a phase locked loop (PLL), a voltage controlled oscillator (VCO), an amplifier, and the like. The PLL may be implemented to constantly maintain the frequency of a provided transmission signal, and the VCO may transfer a transmission signal provided from the PLL to the amplifier after modulating the frequency of the transmission signal. The amplifier may amplify the frequency-modulated signal to have a predetermined magnitude.

The signal reception unit 920 may receive a reflected signal obtained when the transmission signal transmitted from the signal transmission unit 900 is reflected at surroundings.

The beat signal generation unit 940 may mix the signal transmitted by the signal transmission unit 900 and the signal received by the signal reception unit 920, thereby generating a beat signal. The beat signal generation unit 940 may generate the frequency spectrum of a beat signal sampled with a specific frequency by performing a discrete Fourier transform (DFT) at each chirp period.

The target detection unit 960 may detect a target on the basis of the frequency spectrum of a beat signal generated by the beat signal generation unit 940. According to an embodiment of the present invention, the target detection unit 960 may remove a frequency offset from the frequency spectrums, and calculate a correlation value between the frequency spectrums. The target detection unit 960 may recognize a structure existing in the surroundings of a road by removing a frequency offset from spectrums individually shifted to left/right by the velocity of a traveling vehicle, and taking a correlation between frequency spectrums. The target detection unit 960 may sense a target based on a calculated correlation value. When the correlation value calculated by the target detection unit 960 is large, it may be determined that a road structure, such as a guide rail, a tunnel or the like, exists in the surroundings of a vehicle which is currently traveling.

In addition, when a vehicle senses a guide rail located on a curved main road, not on a straight main road, and detects a road environment, the target detection unit 960 may detect a road environment with a new velocity parameter which is calculated based on values obtained by taking the velocity of the vehicle and the curvature of the road into consideration, in order to calculate a correlation value of a frequency range. A curved traffic lane and the curvature thereof may be detected using a method of: making a curved line template based on an arc connecting a start point and an end point which are determined on a straight lane detection; and retrieving a curved line template having the highest matching degree with a current traffic lane.

The processor 980 may be implemented to control the operations of the signal transmission unit 900, the signal reception unit 920, the beat signal generation unit 940, and the target detection unit 960.

As described above, when the method and device for sensing a road environment based on an FMCW radar is used, road environment information can be accurately determined. Road environment information (e.g. a guide rail, a tunnel, or the like) existing at a fixed position can be accurately sensed based on an FMCW radar. When the present invention is applied, and a structure, such as a guide rail, a tunnel, or the like, exists on a road, information on a corresponding structure can be accurately sensed, and thereby, information on a moving object can be accurately sensed as well.

While the present invention has been described with respect to the specific embodiments, it will be apparent to those skilled in the art that various changes and modifications may be made without departing from the spirit and scope of the invention as defined in the following claims.

What is claimed is:

1. A method for detecting a road environment based on a frequency modulated continuous wave (FMCW) radar, the method comprising the steps of:
    the FMCW radar performing a first scan to acquire a first frequency spectrum of beat signals, and shifting the first frequency spectrum based on first velocity information of a vehicle on performing the first scan;
    the FMCW radar performing a second scan to acquire a second frequency spectrum of beat signals, and shifting the second frequency spectrum based on second velocity information of the vehicle on performing the second scan;
    acquiring a correlation value between the shifted first frequency spectrum and the shifted second frequency spectrum which are acquired at different times by the FMCW radar; and
    comparing the correlation value with a set threshold value and detecting the road environment.

2. The method according to claim 1, wherein the step of comparing the correlation value with the set threshold value and detecting the road environment comprises the steps of:

determining that a fixed structure exists in surroundings of the vehicle when the correlation value is greater than the set threshold value; and determining that the fixed structure does not exist in surroundings of the vehicle when the correlation value is equal to or less than the set threshold value.

3. The method according to claim 2, wherein:

the first velocity information is acquired based on peak information of the first frequency spectrum which has been acquired; and the second velocity information is acquired based on peak information of the second frequency spectrum which has been acquired.

4. The method according to claim 1, wherein the first velocity information and the second velocity information are calculated based on information on environments of a road on which the vehicle is traveling.

5. The method according to claim 4, wherein the first velocity information and the second velocity information correspond to values which are calculated by taking curvature information of a curved road into consideration when the vehicle is traveling on the curved road.

6. The method according to claim 5, wherein the curvature information is acquired by detecting a traffic lane region and performing a curved line template matching based on the detected traffic lane region.

7. A frequency-modulated continuous wave (FMCW) radar for detecting a road environment, the FMCW radar comprising a processor, wherein the processor:

performs a first scan to acquire a first frequency spectrum of beat signals, and shifts the first frequency spectrum based on first velocity information of a vehicle on performing the first scan;

performs a second scan to acquire a second frequency spectrum of beat signals, and shifts the second frequency spectrum based on second velocity information of the vehicle on performing the second scan;

acquires a correlation value between the shifted first frequency spectrum and the shifted second frequency spectrum which are acquired at different times by the FMCW radar; and compares the correlation value with a set threshold value and detects the road environment.

8. The FMCW radar according to claim 7, wherein the processor determines that a fixed structure exists in surroundings of the vehicle when the correlation value is greater than the set threshold value, and determines that the fixed structure does not exist in surroundings of the vehicle when the correlation value is equal to or less than the set threshold value.

9. The FMCW radar according to claim 8, wherein:

the first velocity information is acquired based on peak information of the first frequency spectrum which has been acquired; and the second velocity information is acquired based on peak information of the second frequency spectrum which has been acquired.

10. The FMCW radar according to claim 7, wherein the first velocity information and the second velocity information are calculated based on information on environments of a road on which the vehicle is traveling.

11. The FMCW radar according to claim 10, wherein the first velocity information and the second velocity information correspond to values which are calculated by taking curvature information of a curved road into consideration when the vehicle is traveling on the curved road.

12. The FMCW radar according to claim 11, wherein the curvature information is acquired by detecting a traffic lane region and performing a curved line template matching based on the detected traffic lane region.

* * * * *